United States Patent [19]

Eriksson et al.

[11] 4,035,890
[45] July 19, 1977

[54] TOOLHOLDER

[75] Inventors: Stig-Lennart Eriksson; Manfred Wallace Gustafsson, both of Fagersta, Sweden

[73] Assignee: Sandvik Aktiebolag, Sandviken, Sweden

[21] Appl. No.: 687,199

[22] Filed: May 17, 1976

[30] Foreign Application Priority Data

May 20, 1975 Sweden .................................. 7505703

[51] Int. Cl.$^2$ ............................................. B26D 1/00
[52] U.S. Cl. ................................................. 29/96
[58] Field of Search ....................................... 29/96

[56] References Cited
U.S. PATENT DOCUMENTS

| | | | |
|---|---|---|---|
| 2,999,301 | 9/1961 | Conti et al. | 29/96 |
| 3,176,377 | 4/1965 | Milewski | 29/96 |
| 3,205,557 | 9/1965 | Frommelt et al. | 29/96 |
| 3,777,341 | 12/1973 | Faber | 29/96 |
| 3,837,058 | 9/1974 | Barkley et al. | 29/96 |

FOREIGN PATENT DOCUMENTS 1,347,086   11/1963   France .................................. 29/96

Primary Examiner—Leonidas Vlachos
Attorney, Agent, or Firm—Pierce, Scheffler & Parker

[57] ABSTRACT

An improved toolholder for clamping an apertured cutting insert into an insert-receiving site in a forepart of a holder shank. A pin, received in the aperture of the insert, is fitted into a bore provided in the toolholder. A clamping plate and co-operating actuating means urge the insert against the pin. The clamp plate has a V-shaped pocket complementary to two converging edge surfaces of the insert, and on its lower surface is provided with serrations adapted to engage cooperating serrations on a fore portion of the holder shank.

5 Claims, 3 Drawing Figures

TOOLHOLDER

The present invention relates to a toolholder of the type used to hold an apertured cutting insert against a pin located at a forepart of the holder, that enters into the aperture of the insert, a clamp plate being arranged to act on an edge surface of the insert, thus urging the insert against the pin. Toolholders of this type are generally used with triangular cutting inserts of both positive and negative configurations.

Cutting inserts of rhombic or rhomboidic shape are normally used in copying toolholders. In copying toolholders, the insert site is exposed to extreme stresses. Due to the slender form of the copying inserts used, a relatively high torque is applied in the region of the pin. These forces must be absorbed by the edges of the insert-receiving site. Some deformation after a period of operation is almost inevitable, and this causes increased movement of the insert during machining. A copying toolholder should, therefore, have a replaceable insert-receiving site. It should not be necessary to replace the hole of the toolholder simply because the insert site has been deformed.

The present invention provides a simple solution to the above-related problems. According to the invention, the clamp plate is provided with a V-shaped pocket that forms a site for the receipt of the insert. The upper surface of the fore portion of the shank of the holder has serrations extending in the longitudinal direction of said shank portion, the same being adapted to cooperate with mating serrations provided on the lower surface of said clamp plate. This makes it possible to reach highest possible transverse stability.

Closer details of the invention are described in the following specification, taken with the appended drawing, in which.

Figure 1:
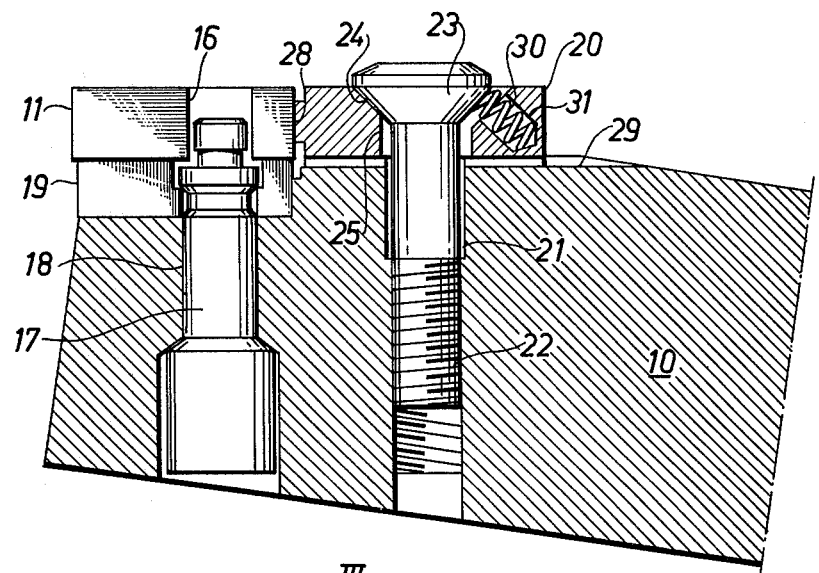
FIG. 1 is a section on line I—I in FIG. 2, of a toolholder according to the invention.
Figure 2:
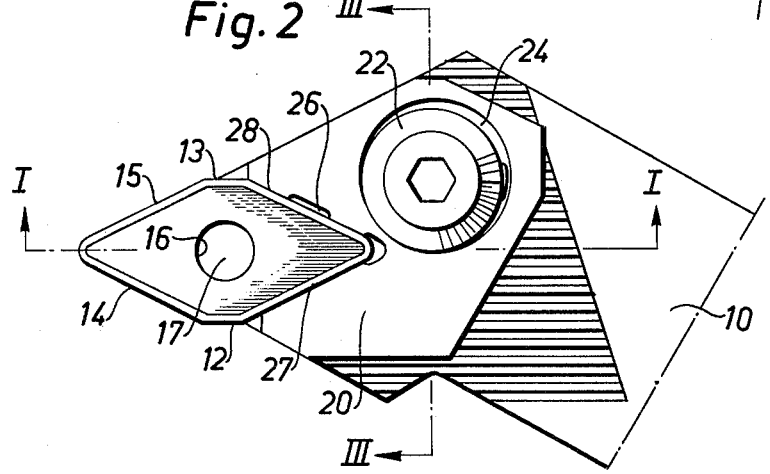
FIG. 2 is an elevational top view of the toolholder shown in FIG. 1.
Figure 3:
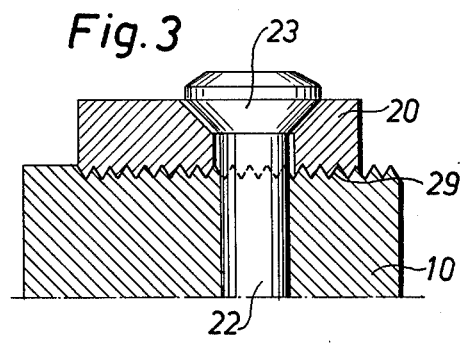
FIG. 3 is a section on line III—III in FIG. 2.

Referring to FIGS. 1 to 3, a toolholder comprises a shank 10 formed at one end with a site to receive a cutting insert 11 for copying operations. This insert is of rhombic shape having a nose point angle of less than 60°. It is to be understood, however, that also copying inserts with nose point angles in the range 60° – 90° could be applied to such holder. This rhombic-shaped insert also comprises parallel edge portions 12 and 13 which separate the edges extending towards the cutting tips, each said edge portion being formed as an out-facing cutting edge. When the insert 11 is clamped in the position illustrated in FIGS. 1 and 2, the edge 14 forms a main cutting edge, the edge 15 a secondary cutting edge and the edge portion 12 an out-facing cutting edge. The insert has a central aperture 16 through it. A pin 17 which is received in a bore 18 that adjoins the insert site enters into the aperture 16 of the insert. The bottom surface of the insert site is formed by a detachable shim plate 19.

The clamping means comprises a clamp plate 20 which is provided with a screw 22 that is received in a bore 21 in the holder. The head 23 of the screw 22 is of conical shape to cooperate with a complementary conically recessed portion 24 in a bore 25 through the plate 20. The screw 22 is eccentrically displaced with respect to said conically recessed portion 24, thus obtaining a wedging effect of the clamp plate 20 upon tensioning screw 22 such that said plate acts against adjacent edge surfaces of the insert and urges it against the pin 17.

The fore portion of the clamp plate 20 is formed as a V-shaped pocket providing side surfaces 26 and 27 complementary to the converging edge surfaces of the insert. Sutiably, one of said side surfaces is provided with protrusions 28 for abutment with an edge surface of the insert, which relationship promotes a more secure and stable abutment for the insert in its pocket. The lower surface of the plate 20 is provided with serrations 29 to mate with corresponding serrations on the upper surface of the shank, said serrations extending in the longitudinal direction of the fore portion of the shank 10. These serrations 29 preferably should extend in a direction parallel with the bisector of the V-shaped insert-receiving pocket of the clamp plate 20.

For the purpose of facilitating replacement of the insert, a spring 30 is located to enter into a recess portion 24 of the clamp plate 20. The spring 30 is received in a bore 31 in said plate, and is so directed that, when loosening the screw 22, it urges the plate 20 inwards towards the shank 10. At the same time it is ensured that the serrations 29 are kept in engagement with each other which prevents impurities coming thereinto.

I claim:

1. In a copying toolholder for clamping a slender-formed copying insert (11) into an insert-receiving site in a fore portion of a holder shank (10), there being a pin (17) fitted into a bore (18) in the holder while received in the aperture (16) of the insert, and there being a clamp plate (20) and associated actuating device (22) positioned for acting on an adjacent edge surface of the insert to urge said clamp plate and said insert against said pin, the improvement according to which the clamp plate is provided with a V-shaped pocket comprising two side surfaces (26, 27) for abutment with two converging edge surfaces of the insert, the angle between said side surfaces being less than 90°, the lower surface of said clamp plate having serrations (29) extending in the longitudinal direction of the fore portion of said shank adapted to cooperate with and be slidable along mating serrations on the upper surface of said fore portion of the shank upon tensioning said actuating device (22).

2. Toolholder as defined in claim 1, wherein the serrations extend in a direction parallel with the bisector of the angle between the side surfaces of the V-shaped pocket.

3. Toolholder as defined in claim 1, in which the actuating device of the clamp plate is a screw (22) passing therethrough, the head (23) of which screw is conical and received in a conical recess (24) in the clamp plate, the axis of said conical recess being eccentrically offset from that of said screw head.

4. Toolholder as defined in claim 1, in which one of the side surfaces defining the V-shaped insert-receiving pocket is provided with protrusions (28) for abutment with an edge surface of the insert.

5. A toolholder for clamping an apertured cutting insert (11) into an insert-receiving site in a fore portion of a holder shank (10), there being a pin (17) fitted in a bore (18) in the holder while received in the aperture (16) of the insert, and there being a clamp plate (20) and associated actuating device, a screw (22) passing through said clamp plate, positioned for acting on an adjacent edge surface of the insert to urge said clamp plate and said insert against said pin, the improvement according to which the clamp plate is provided with a V-shaped pocket comprising two side surfaces (26, 27) for abutment with two converging edge surfaces of the insert, the lower surface of said clamp plate having serrations (29) extending in the longitudinal direction of the fore portion of said shank adapted to cooperate with and be slidable along mating serrations on the upper surface of said fore portion of the shank upon tensioning said actuating device (22), a spring (30) being received in a bore (31) in said clamp plate and so directed that it urges the plate inwards towards the shank upon unscrewing said screw (22).

* * * * *

UNITED STATES PATENT OFFICE
CERTIFICATE OF CORRECTION

PATENT NO. : 4,035,890
DATED : July 19, 1977
INVENTOR(S) : Stig-Lennart Eriksson, Manfred Wallace Gustafsson It is certified that error appears in the above-identified patent and that said Letters Patent are hereby corrected as shown below:

Assignee should read:
[73] Assignee:
- Seco Tools AB - Fagersta, Sweden

Signed and Sealed this

Twenty-seventh Day of September 1977

[SEAL]

Attest:

RUTH C. MASON
*Attesting Officer*

LUTRELLE F. PARKER
*Acting Commissioner of Patents and Trademarks*